(12) United States Patent
Smith et al.

(10) Patent No.: US 8,979,121 B2
(45) Date of Patent: Mar. 17, 2015

(54) PYROTECHNIC INFLATOR WITH CENTRAL DIFFUSER AND COMPOSITE OVERWRAP

(71) Applicants: Bradley W. Smith, Plain City, UT (US); Matthew A. Cox, Centerville, UT (US)

(72) Inventors: Bradley W. Smith, Plain City, UT (US); Matthew A. Cox, Centerville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/664,023

(22) Filed: Oct. 30, 2012

(65) Prior Publication Data

US 2014/0144343 A1   May 29, 2014

(51) Int. Cl.
*B60R 21/36* (2011.01)
*B60R 21/264* (2006.01)
*F42B 3/04* (2006.01)
*B60R 21/26* (2011.01)

(52) U.S. Cl.
CPC .............. *B60R 21/2644* (2013.01); *F42B 3/04* (2013.01); *B60R 2021/26082* (2013.01)
USPC ............ 280/736; 280/741; 102/530; 102/531

(58) Field of Classification Search
CPC ..................... B60R 2021/26076; B60R 21/26
USPC ........................... 280/741, 736; 102/530–531
See application file for complete search history.

(56) References Cited

U.S. PATENT DOCUMENTS

| | | |
|---|---|---|
| 3,772,062 A | 11/1973 | Shur et al. |
| 3,843,010 A | 10/1974 | Morse et al. |
| 3,874,544 A | 4/1975 | Harmon |
| 3,969,812 A | 7/1976 | Beck |
| 4,640,312 A | 2/1987 | Patell et al. |
| 4,835,975 A | 6/1989 | Windecker |
| 4,865,210 A | 9/1989 | Brainard, II |
| 4,982,870 A | 1/1991 | Van Loon |
| 5,028,070 A | 7/1991 | Bender |
| 5,062,367 A | 11/1991 | Hayashi et al. |
| 5,100,171 A | 3/1992 | Faigle et al. |
| 5,264,059 A | 11/1993 | Jacaruso et al. |
| 5,340,148 A | 8/1994 | Faigle et al. |
| 5,492,364 A | 2/1996 | Anderson et al. |
| 5,671,946 A | 9/1997 | Whalen et al. |
| 5,884,938 A * | 3/1999 | Rink et al. ..................... 280/741 |
| 6,007,098 A * | 12/1999 | Olson et al. ................... 280/236 |
| 6,485,053 B2 * | 11/2002 | Fujimoto et al. .............. 280/741 |
| RE38,494 E | 4/2004 | Kirker et al. |
| 6,818,082 B2 * | 11/2004 | Rink et al. .................. 149/109.4 |
| 7,147,124 B2 | 12/2006 | Minta et al. |
| 7,175,894 B2 | 2/2007 | Nakamura |
| 7,185,588 B2 * | 3/2007 | Clark et al. ................... 102/530 |

(Continued)

Primary Examiner — James English
(74) Attorney, Agent, or Firm — Pauley Petersen & Erickson

(57) ABSTRACT

A pyrotechnic inflator assembly including a shell member and an end cap joinable with the shell member to form a subassembly. The subassembly contains a quantity of pyrotechnic material and at least in part defines a combustion chamber wherein at least a portion of the quantity of pyrotechnic material is reactable to form product gas for inflation of an associated airbag cushion and to generate pressure therewithin. A diffuser assembly can be disposed adjacent an end of the shell member and includes flow control features for controlling flow of product gas from the inflator assembly. The inflator assembly further includes a composite overwrap about at least a portion of the subassembly and the diffuser assembly such that the pyrotechnic inflator assembly can withstand the pressure generated within the combustion chamber upon reaction of the pyrotechnic material. Corresponding methods of making a pyrotechnic inflator assembly are also provided.

28 Claims, 6 Drawing Sheets

(56) References Cited

U.S. PATENT DOCUMENTS

| | | |
|---|---|---|
| 7,516,983 B2 | 4/2009 | Suehiro et al. |
| 7,597,353 B2 | 10/2009 | Smith et al. |
| 7,712,778 B2 * | 5/2010 | Smith et al. .................. 280/736 |
| 8,167,334 B2 * | 5/2012 | Kratz et al. .................. 280/736 |
| 2002/0109339 A1 * | 8/2002 | Al-Amin ....................... 280/736 |
| 2004/0235378 A1 | 11/2004 | Byma et al. |
| 2005/0225064 A1 | 10/2005 | Suehiro et al. |
| 2006/0060325 A1 | 3/2006 | Gordon et al. |
| 2006/0267322 A1 | 11/2006 | Eckelberg |
| 2007/0125488 A1 | 6/2007 | Bisson et al. |
| 2012/0234839 A1 | 9/2012 | Smith et al. |
| 2012/0235392 A1 | 9/2012 | Smith |

* cited by examiner

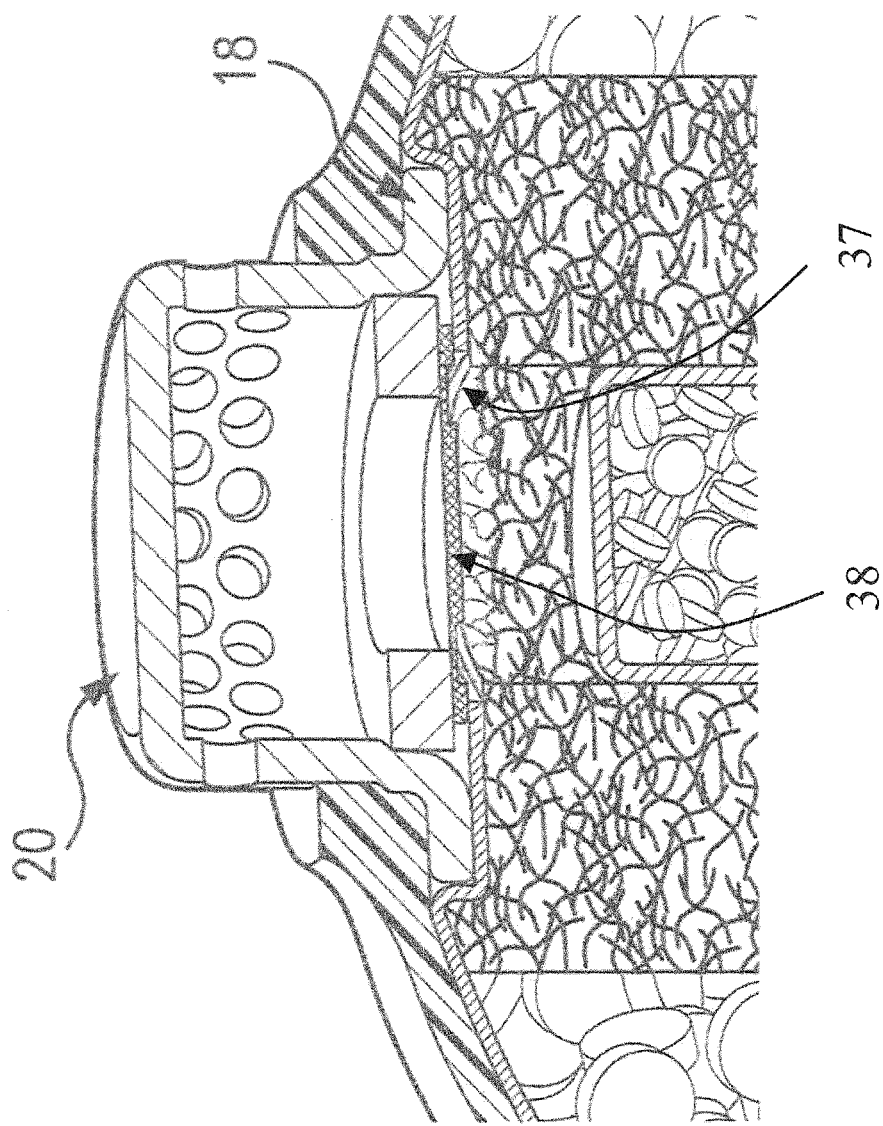

PYROTECHNIC INFLATOR WITH CENTRAL DIFFUSER AND COMPOSITE OVERWRAP

CROSS REFERENCE TO RELATED APPLICATION

The subject matter of this application is related to prior U.S. patent application Ser. No. 13/051,855, filed on 18 Mar. 2011. The disclosure of this related patent application is hereby incorporated by reference herein and made a part hereof, including but not limited to those portions which specifically appear hereinafter.

BACKGROUND OF THE INVENTION

This invention relates generally to the providing or supplying of inflation gas. More particularly, the invention relates to assemblies for providing or supplying an inflation gas such as may be desired for certain inflatable passive restraint systems for use in vehicles for restraining the movement of an occupant in the event of a vehicular collision as well as methods of forming or making such inflator assemblies.

It is well known to protect a vehicle occupant by means of safety restraint systems which self-actuate from an undeployed to a deployed state without the need for intervention by the operator, i.e., "passive restraint systems." Such systems commonly contain or include an inflatable vehicle occupant restraint or element, such as in the form of a cushion or bag, commonly referred to as an "airbag cushion." In practice, such airbag cushions are typically designed to inflate or expand with gas when the vehicle encounters a sudden deceleration, such as in the event of a collision. Such airbag cushions may desirably deploy into one or more locations within the vehicle between the occupant and certain parts of the vehicle interior, such as the doors, steering wheel, instrument panel or the like, to prevent or avoid the occupant from forcibly striking such parts of the vehicle interior. For example, typical or customary vehicular airbag cushion installation locations have included in the steering wheel, in the dashboard on the passenger side of a car, along the roof line of a vehicle such as above a vehicle door, and in the vehicle seat such as in the case of a seat-mounted airbag cushion. Other airbag cushions such as in the form of knee bolsters and overhead airbags also operate to protect other or particular various parts of the body from collision.

In addition to one or more airbag cushions, inflatable passive restraint system installations also typically include a gas generator, also commonly referred to as an "inflator." Upon actuation, such an inflator device desirably serves to provide an inflation fluid, typically in the form of a gas, used to inflate an associated airbag cushion. Various types or forms of inflator devices have been disclosed in the art for use in inflating an inflatable restraint system airbag cushion.

One particularly common type or form of inflator device used in inflatable passive restraint systems is commonly referred to as a pyrotechnic inflator. In such inflator devices, gas used in the inflation of an associated inflatable element is derived from the combustion of a pyrotechnic gas generating material.

Typically, pyrotechnic inflators include a pressure vessel housing so as to be able to withstand the 10 MPa to 30 MPa internal pressures created during combustion of the pyrotechnic gas generating material contained within the inflator. In practice, such pressure vessels are commonly made by welding together two or more metal, e.g., steel or aluminum, components after the loading therein of the inflator internal contents, such as the pyrotechnic gas generating material, for example.

The automotive industry, however, continues to seek inflatable restraint systems that are smaller, lighter, and less expensive to manufacture. As industry constraints regarding factors such as the weight and size of vehicle components continue to evolve, corresponding changes to associated inflatable restraint systems are desired and required in order to better satisfy such constraints.

SUMMARY OF THE INVENTION

The present invention provides improved pyrotechnic inflator assemblies as well as methods of or for making such pyrotechnic inflator assemblies.

In accordance with one aspect, there is provided a pyrotechnic inflator assembly that contains a quantity of pyrotechnic material and has an initiator that upon actuation initiates reaction of the pyrotechnic material. The pyrotechnic inflator assembly includes a shell member and an end cap joinable with the shell member. The shell member has an inner surface, an outer surface, an open first end and a second end opposite the first end. The end cap is joinable with the shell member to at least in part enclose the open first end of the shell member to form an inflator subassembly. The inflator subassembly contains a quantity of pyrotechnic material and at least in part defines a combustion chamber wherein at least a portion of the quantity of pyrotechnic material is reactable to form product gas for inflation of an associated airbag cushion and to generate pressure within the combustion chamber. The end cap at least in part contains the initiator. The pyrotechnic inflator assembly also includes a diffuser assembly disposed adjacent the second end of the shell member in an outwardly extending direction. The diffuser assembly includes a plurality of flow control features for controlling flow of product gas from the inflator assembly. The pyrotechnic inflator assembly further includes an overwrap. The overwrap desirably includes a composite of fibers and a resin matrix system and is disposed about at least a portion of the inflator subassembly and the diffuser assembly to form a pyrotechnic inflator assembly such that the inflator assembly can withstand the pressure generated within the combustion chamber upon reaction of the pyrotechnic material.

In accordance with another embodiment there is provided a pyrotechnic inflator assembly that includes a metal shell member having an inner surface, an outer surface, an open first end and a closed second end opposite the first end. The shell member is desirably formed of metal. An end cap is joinable with the shell member to at least in part enclose the open first end of the shell member to form an inflator subassembly. The inflator subassembly contains a quantity of pyrotechnic material and at least in part defines a combustion chamber wherein at least a portion of the quantity of pyrotechnic material is reactable to form product gas for inflation of an associated airbag cushion and to generate pressure within the combustion chamber. The inflator subassembly also includes a damper pad element at least in part disposed between the pyrotechnic material and the end cap. The end cap at least in part contains an initiator that upon actuation initiates reaction of the pyrotechnic material. The inflator assembly further includes a diffuser assembly disposed adjacent the second end of the shell member in an outwardly extending direction. The diffuser assembly includes a plurality of flow control features for controlling flow of product gas from the inflator assembly. A filter assembly is disposed adjacent the inner surface of the second end of the shell member.

The filter assembly includes a filter element in operational gas flow alignment with the diffuser assembly. An igniter assembly, at least in part in operational communication with the initiator, is at least in part disposed within the filter assembly. The inflator assembly further includes an overwrap about at least a portion of the inflator subassembly and the adjacently disposed diffuser assembly to form a pyrotechnic inflator assembly that withstands the pressure generated within the combustion chamber upon reaction of the pyrotechnic material. The overwrap includes a composite of fibers and a resin matrix system. The shell member of the assembly is incapable of withstanding the pressure generated within the combustion chamber upon reaction of the pyrotechnic material without support provided by the overwrap.

In another aspect, there is provided a method of making a pyrotechnic inflator assembly. In accordance with one such method of making a pyrotechnic inflator assembly, a shell member having an inner surface, an outer surface, an open first end and a second end opposite the first end is joined with an end cap to at least in part enclose the open first end of the shell member to form a first inflator subassembly. The first inflator subassembly contains a quantity of pyrotechnic material and at least in part defines a combustion chamber wherein the at least a portion of the quantity of pyrotechnic material is reactable to form product gas for inflation of an associated airbag cushion and to generate pressure within the combustion chamber. A diffuser assembly is positioned adjacent the second end of the shell member of the first inflator subassembly in an outwardly extending direction to form an inflator device precursor. The method further involves overwrapping the inflator device precursor with a composite of fibers and a resin matrix system. The composite overwrapped precursor is UV cured to form a pyrotechnic inflator assembly that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap.

Other objects and advantages will be apparent to those skilled in the art from the following detailed description taken in conjunction with the appended claims and drawings.

BRIEF DESCRIPTION OF THE DRAWINGS

FIG. 2 is a sectional view of the inflator device precursor to the pyrotechnic inflator assembly shown in FIG. 1, more specifically, the assembly is shown prior to the application thereabout of an overwrap in accordance with the invention.

FIG. 2a is a fragmentary sectional view of a pyrotechnic inflator assembly in accordance with another aspect of the invention.

FIG. 3 is partially exploded sectional view of the inflator device precursor shown in FIG. 2.

FIG. 4 is a sectional view of an inflator subassembly of the pyrotechnic inflator assembly shown in FIG. 1, but prior to crimping of the shell member over or onto the end cap.

FIG. 5 is a sectional view similar to that shown in FIG. 4, but after crimping of the shell member over or onto the end cap.

DETAILED DESCRIPTION OF THE INVENTION

As described in greater detail below, the present invention provides improved pyrotechnic inflator assemblies as well as methods of or for making such pyrotechnic inflator assemblies.

Figure 1:
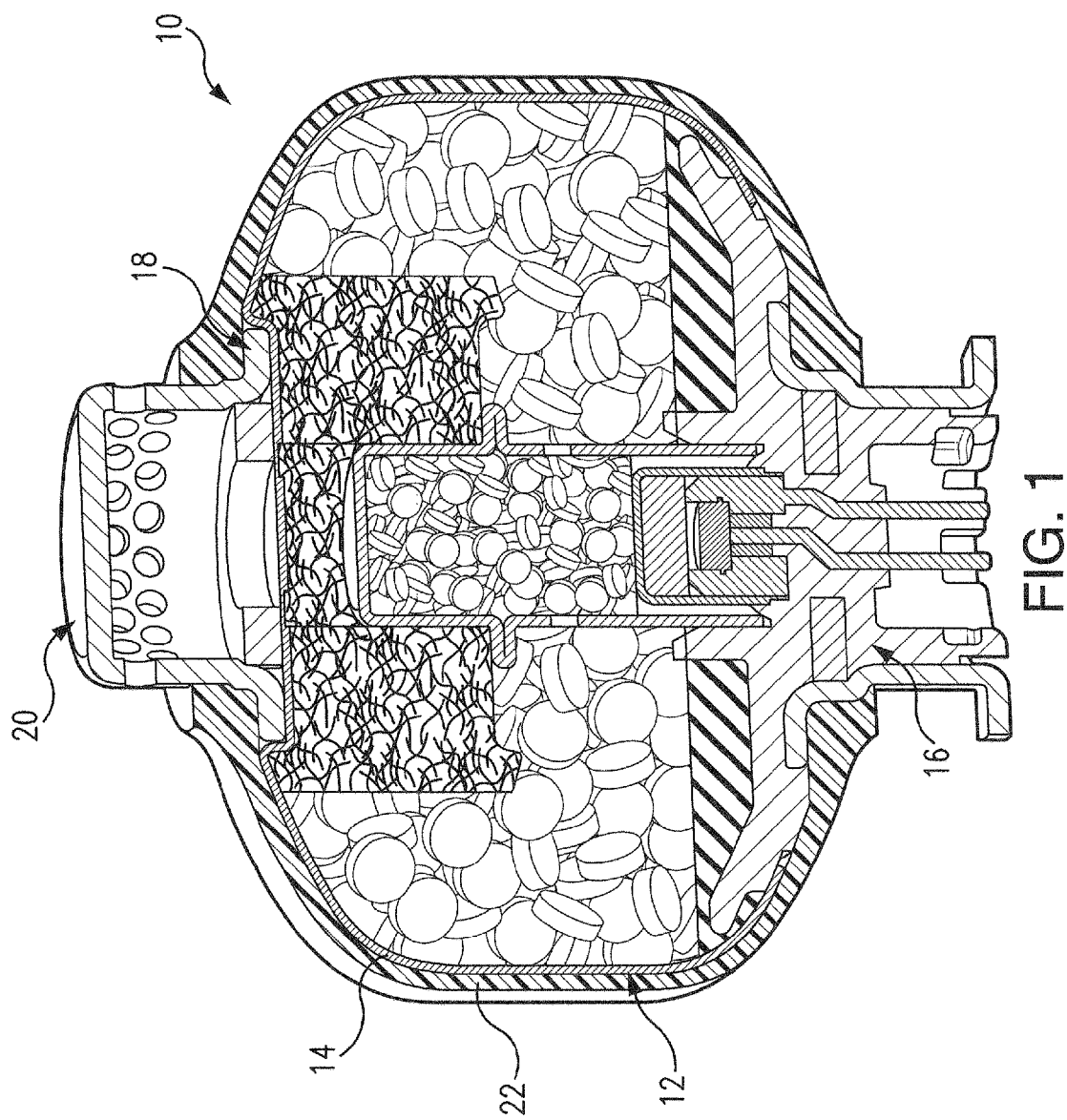
FIG. 1 is a sectional view of a pyrotechnic inflator assembly in accordance with one aspect of the invention.

FIG. 1 illustrates a pyrotechnic inflator assembly in accordance with one aspect of the invention and generally designated by the reference numeral 10. The pyrotechnic inflator assembly 10 is generally composed of an inflator subassembly 12 including a shell member 14 and an end cap 16. As described further below, an inflator device precursor assembly 18 is formed by the addition and/or inclusion of a diffuser assembly 20 to the inflator subassembly 12. The pyrotechnic inflator assembly 10 further includes a composite material, such as composed of high strength fibers and a resin matrix system to form an overwrap thickness 22 around, about and/or over at least selected desired portions of the precursor assembly 18.

The pyrotechnic inflator assembly 10 and, more particularly, the subassembly 12 and the inflator precursor assembly 18 will be described further making reference to FIGS. 2-5.

Figure 2:
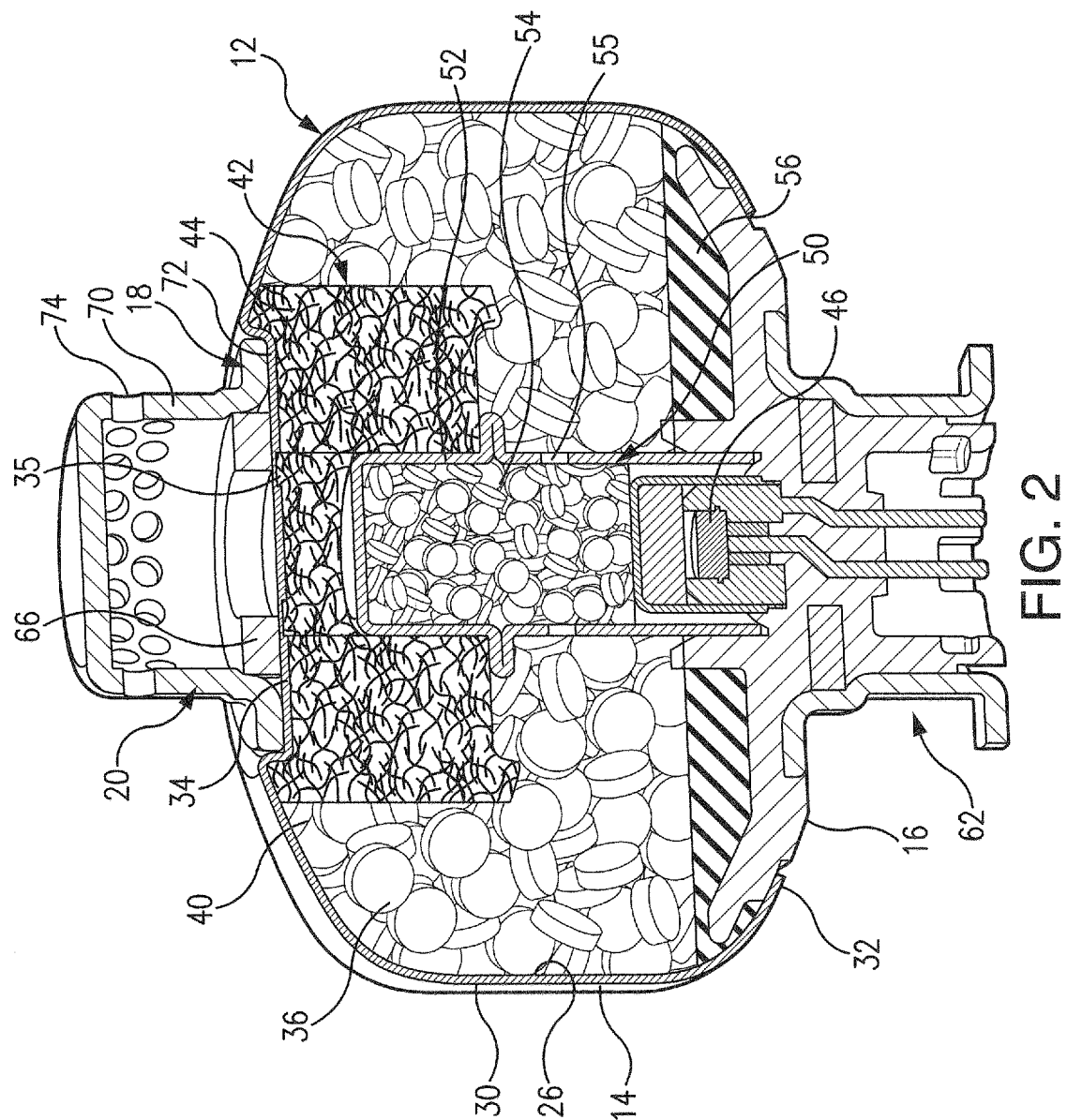
FIGS. 2-5 show the pyrotechnic inflator assembly of FIG. 1 at selected stages in the assembly process. More specifically.
Figure 3:
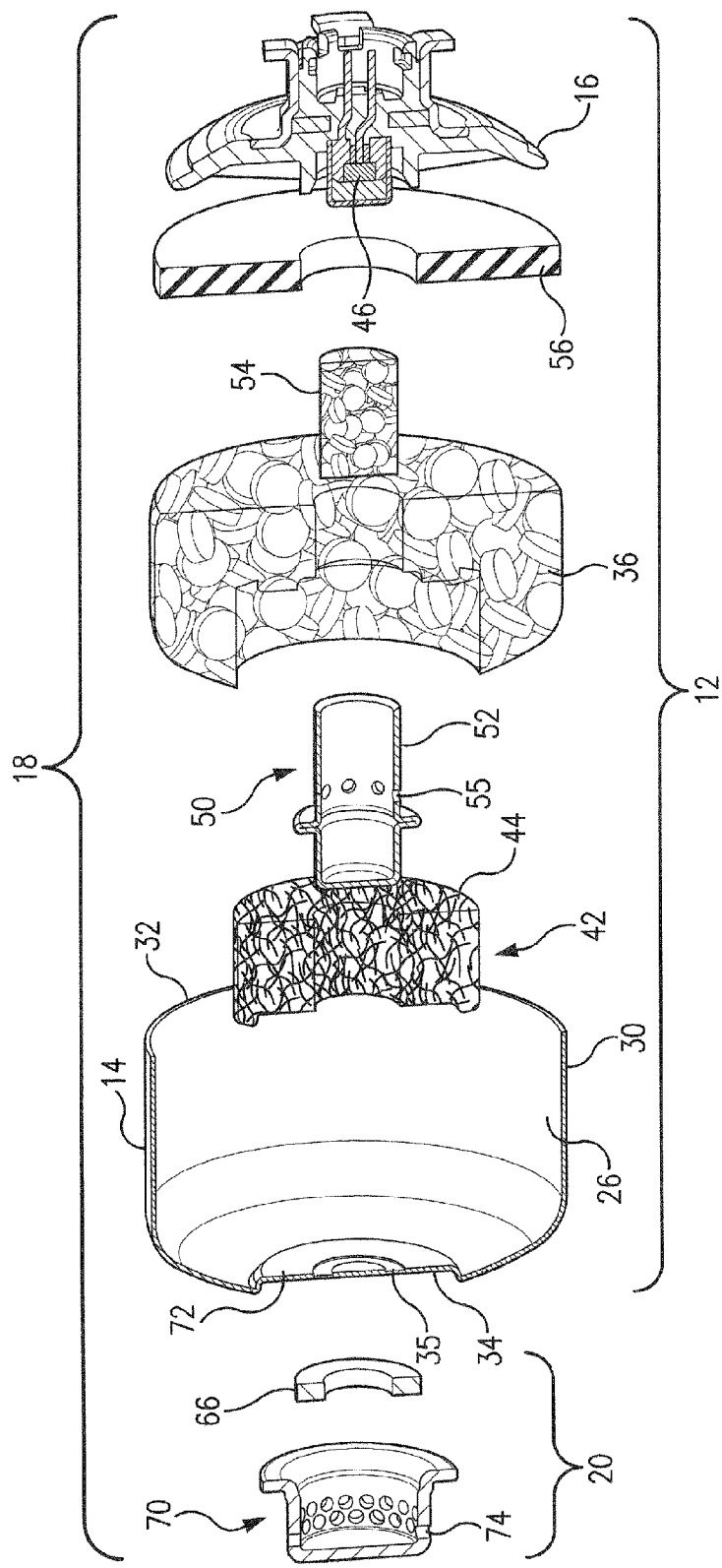

As perhaps best viewed by making reference to FIGS. 2 and 3, the shell member 14 has or includes an inner surface 26, an outer surface 30, a first end 32 and a second end 34, generally opposite the first end 32. The first end 32 is open, such as to permit access to the interior of the shell member 14. In this illustrated embodiment, the shell member 14 has a generally elliptical, truncated bulbous or rounded disc form or shape. Those skilled in the art and guided the teaching herein provided, however, will appreciate that shell members of other forms or shapes can, if desired, be used. While spherical shaped shell members can be advantageous from a structural design view, the utilization of such a spherical shaped shell member can result in an inflator assembly of too great an overall height such as to hinder installation and placement of such an inflator assembly in a selected vehicle. On the other hand, the utilization of a flat, closed end shell member while generally resulting in a smaller or smallest height inflator assembly does not generally form as a strong a structural component as may be desired. Thus, the use of an elliptical shaped shell member can advantageously provide structural design while reducing the height of the resulting inflator assembly.

As will be described in greater detail below, the shell member 14 can desirably be fabricated or formed of metal, such as drawn steel or aluminum, for example, wherein the metal is relatively thin as compared to conventional pyrotechnic pressure vessel housings. For example, whereas conventional pyrotechnic pressure vessel metal housings are commonly 2 to 3 mm thick, the invention permits the utilization of metal shell members having a thickness of less than 1 mm and in some cases having a thickness of substantially less than 1 mm, e.g., a metal shell member having a thickness of 0.5 mm or less.

The shell member second end 34 is desirably closed. In one preferred embodiment, the second end 34 is closed and formed into the thin metal shell member 14. Alternatively, if desired, as shown in FIG. 2a, the second end may include an opening 37 with a seal 38 or the like disposed onto such a shell member opening to enclose or otherwise appropriately seal such opening. For example, those skilled in the art and guided by the teachings herein provided will appreciate that a seal such as formed of or by a copper or aluminum foil, can be used on or bonded over such a shell member opening to provide a desired controlled breakout pressure.

Figure 4:
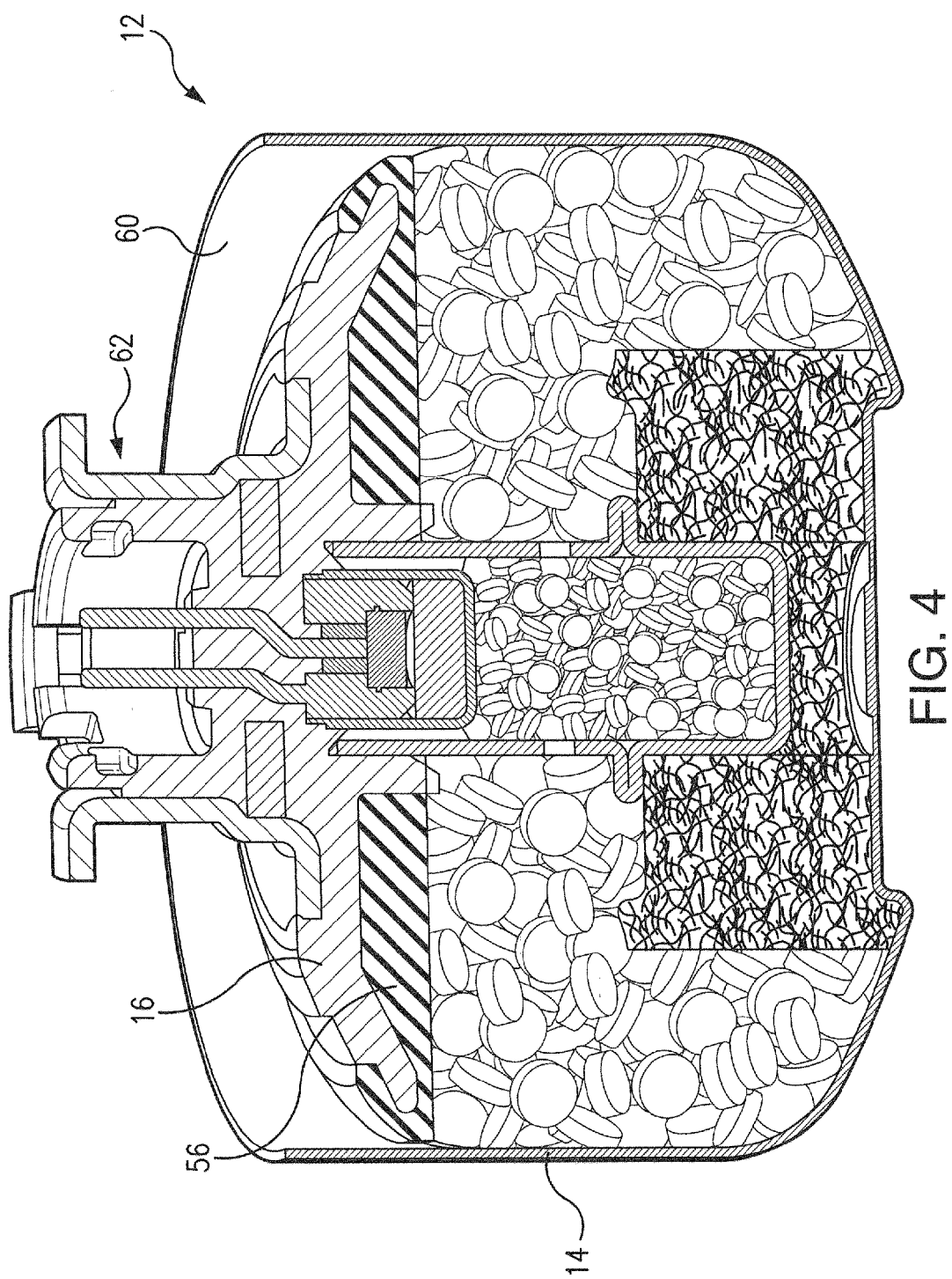
Figure 5:
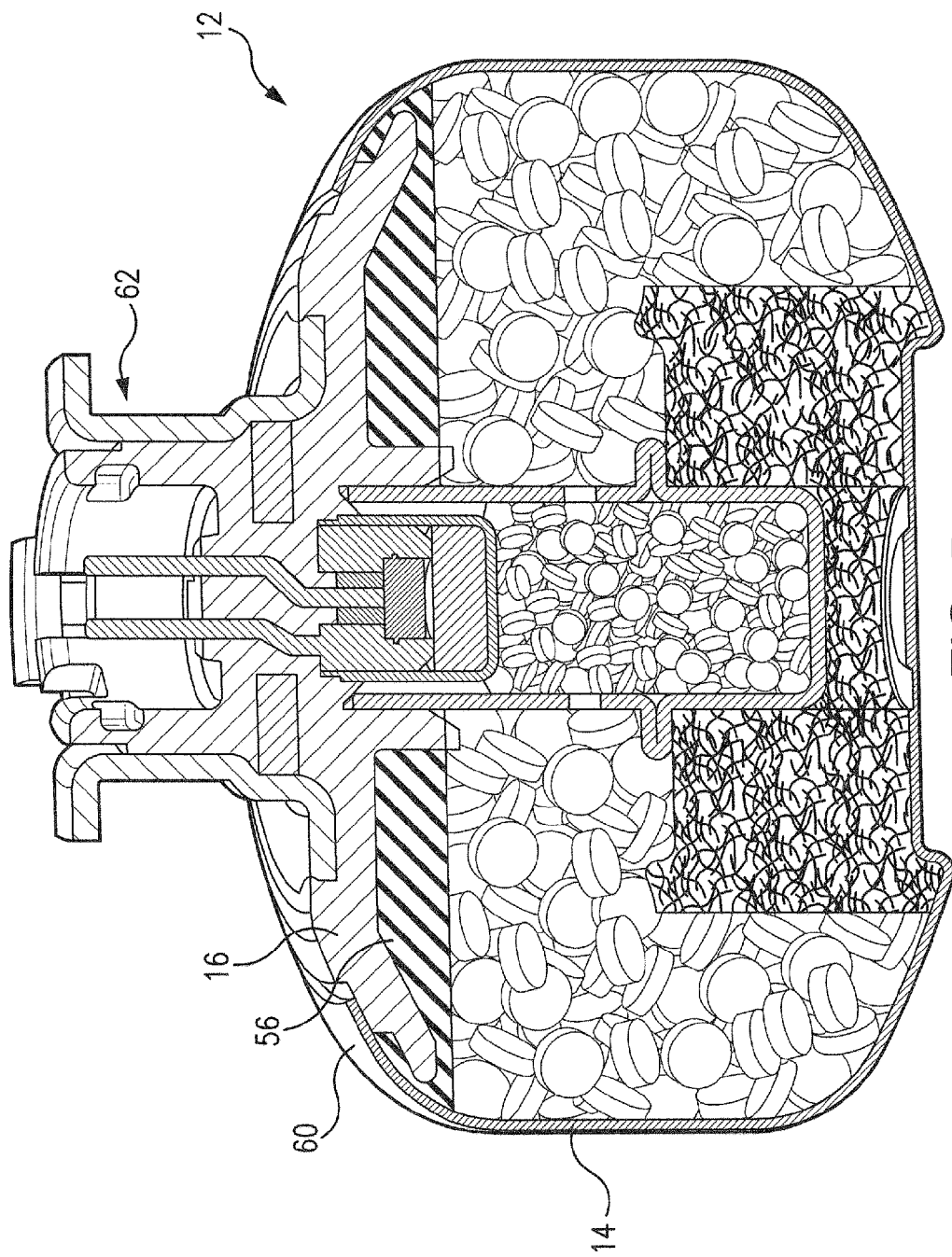

The end cap 16 is joinable with the shell member 14 to at least in part enclose the open first end 32 of the shell member 14 to form the subassembly 12, such as more specifically shown in FIGS. 4 and 5 and further more specifically described below.

The subassembly 12 contains a quantity of pyrotechnic gas generant material 36. In one preferred embodiment, the pyrotechnic gas generant material is desirably in the form of tablets or the like, as the invention can facilitate the incorporation and use of lower cost tableted forms of gas generants and propellants. Those skill in the art and guided by the teaching herein provided will, however, appreciate that, if desired, other forms or shapes of pyrotechnic gas generant materials such as known in the art, such as wafers, for example, can be used.

The subassembly 12 serves as or acts to at least in part define a combustion chamber 40 wherein at least a portion of the quantity of pyrotechnic material 36 is reactable to form product gas for inflation of an associated airbag cushion (not shown) and, as a result, to generate pressure within the combustion chamber.

As identified above, the shell member second end 34 is desirably closed. Such a closed second end may include a sealed opening such as to provide a desired controlled breakout pressure. In an alternative embodiment, the second end can desirably include breakout pressure-controlling scoring 35 such as whereby the closed second end 34 can be controllably opened via the application of a sufficient internal pressure thereagainst such as can be realized upon reaction of the pyrotechnic material 36 such as to form product gas for inflation of an associated airbag cushion and to generate pressure within the combustion chamber 40.

The subassembly 12, more particularly, the shell member 14 may also contain a filter assembly generally designated 42, such as including or having a filter element 44.

Those skilled in the art and guided by the teachings herein provided will appreciate that it may be desirable to include a filter element within the assembly such as to desirably serve to cool the gases formed upon combustion of a pyrotechnic material prior to discharge or release of gases from the device or assembly. Alternatively or in addition, the inclusion of a filter element may desirably serve to trap or otherwise remove particulate matter from the combustion gases prior to discharge or release of gases from the device or assembly.

In general, significant or important characteristics for such filter elements typically include cost, mass, thermal conductivity of the material, surface area, pore size, and distance the gas has to travel to get through the filter element (i.e., residence time). Thus, while suitable filter elements for use in the practice of the invention can desirably take various forms, shapes or designs, wound metallic mesh or pressed, porous metallic member filter elements can be advantageous or preferred as such filter elements perhaps can most economically provide sought and/or desired characteristics in a filter element. In accordance with one preferred embodiment, a filter element for incorporation and use in an inflator assembly as herein described can advantageously be made or formed of compressed steel or preferably stainless steel wire. For example, a suitable such filter element may take the form of a cylindrical filter composed of 0.5 mm diameter wire with a total compressed mass of 25 to 30 grams and an approximate size of 11 mm ID×31 mm OD×14 mm length/height.

The incorporation and placement of a filter element such as compressed wire mesh, such as disclosed herein adjacent the inner surface of the second end of the shell member, allows for a large area of the filter media to be generally adjacent the gas generant pyrotechnic material and a relatively smaller area of the filter media at the gas exit point and also can desirably provide a longer gas flow path through the filter to provide improved or increased particular removal and/or temperature reduction.

The end cap 16 can desirably form one end of the inflator assembly 10. The end cap 16 can also desirably at least in part contain or otherwise include an initiator 46 that upon actuation initiates reaction of the pyrotechnic material 36. The end cap 16 can desirably be formed of molded plastic with the initiator 46 integrally molded in place, such as by placing the initiator into a mold and subsequently injecting the plastic material into the mold around the initiator to form the component. While various plastic materials such as are known in the art can be used, glass-filled nylon such as 33% glass-filled nylon 6/12, may be particularly preferred. Further, if desired or required, one or more metal inserts can be included in the plastic molded cross section such as to improve the structural capability of the final component. In an alternative embodiment, the end cap can be made out of a cast or machined metal, such as aluminum, with the initiator crimped or molded in position. Those skilled in the art will appreciate that initiators and pyrotechnic materials are known in the art and that a variety of different features may be used for these components.

An igniter assembly 50, such as at least in part disposed within the filter assembly 42, can additionally be included. In the illustrated embodiment, the igniter assembly 50 can include an igniter tube 52.

As shown, the igniter assembly 50 can be at least in part desirably be in operational communication with the initiator 46. For example, the igniter tube 52 can be loaded with or otherwise appropriately contain a selected quantity of an igniter material 54, such in the form of tablets, such that actuation of the initiator 46 will result in or produce reaction of the igniter material 54. Resulting igniter material reaction products can then pass through and communicate with the pyrotechnic gas generant material 36 via the outlets 55 formed, made or created in the igniter tube 52 so as to result in or produce reaction thereof and thus gas generation or production. Various igniter materials and forms of igniter materials are known in the art and the broader practice of the invention is not necessarily limited to specific igniter materials or particular forms thereof.

In accordance with one preferred embodiment, the igniter tube 52 can be inserted into the filter 44 and then together they are inserted into the thin metal shell member 14. The igniter material 54 can then be loaded into the igniter tube 52 followed by loading of the gas generant material 36, such as in the form of tablets, into the space surrounding the igniter tube/filter.

A damper pad 56, such as of silicone foam rubber, can then be placed on top of the open first end 32 of the thin metal shell member 14. As will be appreciated, the inclusion of a damper pad 56 can serve to cushion the pyrotechnic gas generant tablets or other selected generant form within the assembly such as to avoid or minimize breakage that could undesirably alter the gas generating performance characteristics of the gas generating material. The end cap 16, such as including the initiator 46, can subsequently be pressed down into the open end of the thin metal shell member. The damper pad 56 can desirably wrap around the edge of the end cap 16 as it engages the opening of the metal shell member 14. The end cap 16 can desirably nest into the igniter tube 52 and is held down compressing the damper pad 56 against the gas generant tablets 36. The open end of the thin metal shell 14, such open end generally designated by the reference numeral 60, shown in FIGS. 4 and 5, can desirably be crimped over the outer edge of the end cap 16. FIG. 4 shows the subassembly 12 prior to crimping of the shell member 14 over the end cap 16. FIG. 5 shows the subassembly 12 after the shell member 14 has been appropriately crimped over the end cap 16. As a result, the damper pad 56 can be compressed between the base end cap 16 and the metal shell member 14 as the shell member open end 60 is crimped thus forming an environmental seal.

As identified above, the damper pad 56 can be fabricated of silicone foam rubber. Those skilled in the art and guided by the teachings herein provided, however, will understand and appreciate that damper pads of other materials of construction can be used and thus the broader practice of the invention is not necessarily limited to specific or particular damper pas materials of construction.

The end cap 16 may also desirably contain or include mounting provisions 62 such as to permit or facilitate the positioning or mounting of the pyrotechnic inflator assembly 10 such as into an airbag module or directly into a vehicle, for example. Suitable or appropriate mounting provisions can take various forms or shapes such as dependent on the particular application. For example, the inflator assembly 10 includes a mounting provision 62 having the form of extending tabs which can engage an associated airbag module in a bayonet mount type of arrangement. In an alternative embodiment, suitable mounting provisions can take the form of external threads such as can threadingly engage with an associated module.

The diffuser assembly 20, such as composed of an orifice plate 66, such as formed of stamped steel, inserted into the base of a diffuser element 70, can then be positioned with or onto the inflator subassembly 12, such as by inserting the diffuser element 70 into a recess 72 in the center of the outer surface 30 at the second end 34 of the thin metal shell member 14. As identified above, the inflator device precursor assembly 18 is formed by such addition and/or inclusion of the diffuser assembly 20 to the inflator subassembly 12.

The diffuser element 70 contains or includes a plurality of flow control features, such as in the form of orifices 74. As further described below, the orifices 74 facilitate control of the flow of product gas from the inflator assembly 10

A high pressure capable structure is created or formed by overwrapping the inflator device precursor assembly 18 with a selected material such as having the form of a composite.

The overwrap process can generally involve installing or placing the inflator device precursor assembly 18, with the diffuser on top of the precursor assembly, into a filament winding machine and subsequently filament winding a composite material, such as composed of high strength fibers and a resin matrix system, around, about and/or over the precursor assembly 18 to form an overwrap thickness 22 about the precursor assembly.

Various fiber materials such as known in the art can be used. For improved economics, in certain embodiment the use of glass fiber or basalt fiber materials are preferred.

The composite overwrapped precursor assembly can then be treated, such as by curing (e.g., UV or thermal curing) or melt processing of thermal plastic resins, for example, to form a pyrotechnic inflator assembly that withstands the pressure generated within the combustion chamber upon reaction of the pyrotechnic material but wherein the shell member is incapable of withstanding the pressure generated within the combustion chamber upon reaction of the pyrotechnic material without support provided by the composite overwrap.

Processing times can desirably be reduced or minimized by utilizing a UV cure resin system instead of common thermoset, elevated temperature cure resin systems. For example, a typical elevated temperature cure cycle involves heating at 120° C. for 90 minutes, while a UV cure system can effect cure in under 15 seconds when using an optically transparent fiber such as E-glass. UV curing has the additional safety advantage of avoiding subjecting the pyrotechnic material to elevated temperature such as could result in inadvertent actuation or other undesirable degradation of energetic materials, such as included or associated with either or both the initiator and the pyrotechnic material, for example.

In accordance with one preferred embodiment, it has been found advantageous to employ a composite overwrap configuration of about 16 to 17 grams of composite that is wound in three layers about the precursor assembly.

As will be appreciated, pyrotechnic inflator assemblies such as herein described and which assemblies incorporate and employ a central gas diffuser, advantageously allow product gas to exit from the assembly without such product gas having to physically pass or transition through or come in direct contact with the composite overwrap 22.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A pyrotechnic inflator assembly comprising:
a shell member having an inner surface, an outer surface, an open first end and a second end opposite the first end;
an end cap joinable with the shell member to at least in part enclose the open first end of the shell member to form an inflator subassembly, the inflator subassembly containing a quantity of pyrotechnic material and at least in part defining a combustion chamber wherein at least a portion of the quantity of pyrotechnic material is reactable to form product gas for inflation of an associated airbag cushion and to generate pressure within the combustion chamber, the end cap at least in part containing an initiator that upon actuation initiates reaction of the pyrotechnic material;
a diffuser assembly disposed adjacent the second end of the shell member, the diffuser assembly including a plurality of flow control features for controlling flow of product gas from the inflator assembly, the diffuser assembly including a base having a top surface flush with the outer surface of the shell member; and
an overwrap about at least a portion of the inflator subassembly and the base of the diffuser assembly to form the pyrotechnic inflator assembly that withstands the pressure generated within the combustion chamber upon reaction of the pyrotechnic material, the overwrap comprising a composite of fibers and a resin matrix system.

2. The pyrotechnic inflator assembly of claim 1 wherein the shell member is incapable of withstanding the pressure generated within the combustion chamber upon reaction of the pyrotechnic material without support provided by the overwrap.

3. The pyrotechnic inflator assembly of claim 1 wherein the shell member second end is closed.

4. The pyrotechnic inflator assembly of claim 3 wherein the shell member closed second end comprises breakout pressure-controlling scoring.

5. The pyrotechnic inflator assembly of claim 3 wherein the shell member closed second end comprises a seal disposed onto a shell member opening at the second end.

6. The pyrotechnic inflator assembly of claim 1 wherein the diffuser assembly comprises:
a central gas diffuser element and a controlling orifice element at least in part disposed between the central gas diffuser element and the second end of the shell member, the diffuser element comprising a plurality of product gas discharge openings.

7. The pyrotechnic inflator assembly of claim 1 wherein the shell member is formed of metal.

8. The pyrotechnic inflator assembly of claim 7 wherein the shell member metal comprises steel.

9. The pyrotechnic inflator assembly of claim 7 wherein the shell member metal comprises aluminum.

10. The pyrotechnic inflator assembly of claim 1 additionally comprising:
a filter assembly disposed adjacent the inner surface of the second end of the shell member.

11. The pyrotechnic inflator assembly of claim 10 wherein the filter assembly comprises a filter element in operational gas flow alignment with the diffuser assembly.

12. The pyrotechnic inflator assembly of claim 10 additionally comprising:
an igniter assembly at least in part disposed within the filter assembly, the igniter assembly at least in part in operational communication with the initiator assembly.

13. The pyrotechnic inflator assembly of claim 1 additionally comprising:
a damper pad element at least in part disposed between the pyrotechnic material and the end cap.

14. The pyrotechnic inflator assembly of claim 13 wherein the pyrotechnic material is in tablet form.

15. A pyrotechnic inflator assembly comprising:
a metal shell member having an inner surface, an outer surface, an open first end and a closed second end opposite the first end, the shell member being formed of metal;
an end cap joinable with the shell member to at least in part enclose the open first end of the shell member to form an inflator subassembly, the inflator subassembly containing a quantity of pyrotechnic material and at least in part defining a combustion chamber wherein at least a portion of the quantity of pyrotechnic material is reactable to form product gas for inflation of an associated airbag cushion and to generate pressure within the combustion chamber, the inflator subassembly also including a damper pad element at least in part disposed between the pyrotechnic material and the end cap, the end cap at least in part containing an initiator that upon actuation initiates reaction of the pyrotechnic material;
a diffuser assembly disposed adjacent the second end of the shell member in an outwardly extending direction, the diffuser assembly including a plurality of flow control features for controlling flow of product gas from the inflator assembly, the diffuser assembly including a base having a top surface flush with the outer surface of the shell member;
a filter assembly disposed adjacent the inner surface of the second end of the shell member, the filter assembly comprising a filter element in operational gas flow alignment with the diffuser assembly;
an igniter assembly at least in part disposed within the filter assembly, the igniter assembly at least in part in operational communication with the initiator; and
an overwrap about at least a portion of the inflator subassembly and the base of the adjacently disposed diffuser assembly to form the pyrotechnic inflator assembly that withstands the pressure generated within the combustion chamber upon reaction of the pyrotechnic material, the overwrap comprising a composite of fibers and a resin matrix system,
wherein the shell member is incapable of withstanding the pressure generated within the combustion chamber upon reaction of the pyrotechnic material without support provided by the overwrap.

16. The pyrotechnic inflator assembly of claim 15 wherein the shell member closed second end comprises breakout pressure-controlling scoring.

17. The pyrotechnic inflator assembly of claim 15 wherein the diffuser assembly comprises:
a central gas diffuser element and a controlling orifice element at least in part disposed between the central gas diffuser element and the second end of the shell member, the diffuser element comprising a plurality of product gas discharge openings.

18. The pyrotechnic inflator assembly of claim 15 additionally comprising:
a damper pad element at least in part disposed between the pyrotechnic material and the end cap.

19. The pyrotechnic inflator assembly of claim 15 wherein the pyrotechnic material is in tablet form.

20. A method of making a pyrotechnic inflator assembly, the method comprising:
joining a shell member having an inner surface, an outer surface, an open first end and a second end opposite the first end, with an end cap to at least in part enclose the open first end of the shell member to form an inflator subassembly, the inflator subassembly containing a quantity of pyrotechnic material and at least in part defining a combustion chamber wherein the at least a portion of the quantity of pyrotechnic material is reactable to form product gas for inflation of an associated airbag cushion and to generate pressure within the combustion chamber;
positioning a diffuser assembly adjacent the second end of the shell member of the inflator subassembly in an outwardly extending direction to form an inflator device precursor, the diffuser assembly including a base having a top surface flush with the outer surface of the shell member;
overwrapping at least a portion of the inflator subassembly and the base of the adjacently disposed diffuser assembly with a composite of fibers and a resin matrix system to form a composite overwrapped inflator device precursor; and
treating the composite overwrapped inflator device precursor to form the pyrotechnic inflator assembly that withstands the pressure generated within the combustion chamber upon reaction of the pyrotechnic material and wherein the shell member is incapable of withstanding the pressure generated within the combustion chamber upon reaction of the pyrotechnic material without support provided by the composite overwrap.

21. The pyrotechnic inflator assembly of claim 1 wherein the end cap additionally includes mounting provisions to engage an associated airbag module.

22. The pyrotechnic inflator assembly of claim 21 wherein the mounting provisions comprise an extending tab.

23. The pyrotechnic inflator assembly of claim 15 wherein the end cap additionally includes mounting provisions to engage an associated airbag module.

24. The pyrotechnic inflator assembly of claim 23 wherein the mounting provisions comprise an extending tab.

25. An inflator assembly comprising:
- a shell member having an inner surface, an outer surface, an open first end and a second end opposite the first end;
- an end cap joinable with the shell member to at least in part enclose the open first end of the shell member to form an inflator subassembly, the end cap including mounting provisions for mounting the inflator assembly into an airbag module, the mounting provisions comprising an outwardly extending tab;
- a diffuser assembly disposed adjacent the second end of the shell member, the diffuser assembly including a plurality of flow control features for controlling flow of product gas from the inflator assembly, the diffuser assembly including a base having a top surface flush with the outer surface of the shell member; and
- an overwrap about at least a portion of the shell member, the base of the diffuser assembly and the end cap to form the inflator assembly that withstands the pressure generated within the inflator assembly, the overwrap comprising a composite of fibers and a resin matrix system.

26. The inflator assembly of claim 25 wherein:
- the inflator subassembly contains a quantity of pyrotechnic material and at least in part defines a combustion chamber wherein at least a portion of the quantity of pyrotechnic material is reactable to form product gas for inflation of an associated airbag cushion and to generate pressure within the combustion chamber, and
- the end cap at least in part contains an initiator that upon actuation initiates reaction of the pyrotechnic material.

27. The inflator assembly of claim 26 wherein the overwrap about at least a portion of the shell member and the end cap to form the inflator assembly that withstands the pressure generated within the combustion chamber upon reaction of the pyrotechnic material.

28. The inflator assembly of claim 27 additionally comprising:
- a diffuser assembly disposed adjacent the second end of the shell member, the diffuser assembly including a plurality of flow control features for controlling flow of product gas from the inflator assembly; and
- wherein the overwrap additionally extends about at least a portion of the diffuser assembly in forming the inflator assembly that withstands the pressure generated within the combustion chamber upon reaction of the pyrotechnic material.

* * * * *